(12) United States Patent
Iwamoto

(10) Patent No.: US 10,071,455 B2
(45) Date of Patent: Sep. 11, 2018

(54) TOOL MEASURING APPARATUS

(71) Applicant: AMADA COMPANY, LIMITED, Kanagawa (JP)

(72) Inventor: Masami Iwamoto, Kanagawa (JP)

(73) Assignee: AMADA COMPANY, LIMITED, Kanagawa-Ken (JP)

( * ) Notice: Subject to any disclaimer, the term of this patent is extended or adjusted under 35 U.S.C. 154(b) by 635 days.

(21) Appl. No.: 14/427,858

(22) PCT Filed: Sep. 30, 2013

(86) PCT No.: PCT/JP2013/076556
§ 371 (c)(1),
(2) Date: Mar. 12, 2015

(87) PCT Pub. No.: WO2014/061434
PCT Pub. Date: Apr. 24, 2014

(65) Prior Publication Data
US 2015/0224619 A1    Aug. 13, 2015

(30) Foreign Application Priority Data
Oct. 17, 2012   (JP) ................. 2012-229698

(51) Int. Cl.
*G01B 5/18*     (2006.01)
*G01B 21/18*    (2006.01)
(Continued)

(52) U.S. Cl.
CPC ............. *B23Q 17/22* (2013.01); *G01B 21/02* (2013.01); *G01B 21/16* (2013.01); *B21D 28/24* (2013.01)

(58) Field of Classification Search
CPC ........ B23Q 17/22; G01B 21/02; G01B 21/16; B21D 28/00; B21D 28/005; B21D 28/12; B21D 45/006
(Continued)

(56) References Cited

U.S. PATENT DOCUMENTS 4,470,856 A   9/1984  Little et al.
4,489,578 A   12/1984 Nagai et al.
(Continued)

FOREIGN PATENT DOCUMENTS

JP   10-098283    4/1998
JP   2000-033536  2/2000
(Continued)

OTHER PUBLICATIONS

International Search Report from Japan for PCT/JP2013/076556, dated Dec. 3, 2013.
(Continued)

*Primary Examiner* — An Do
(74) *Attorney, Agent, or Firm* — Greenblum & Bernstein, P.L.C.

(57) ABSTRACT

A tool measuring apparatus for measuring a height of a punch body and a die includes a measurement device that measures a distance from a punch reference position that is set preliminarily to an end surface of the punch body, and a distance from a die reference position that is set preliminarily to an end surface of the die. The punch reference position and the die reference position are placed independently from each other. According to the tool measuring apparatus, it is possible to measure a punch body and a die easily even in a case where a size of the punch body and a size of the die are significantly different from each other.

6 Claims, 4 Drawing Sheets

(51) Int. Cl.
*B23Q 17/22* (2006.01)
*G01B 21/02* (2006.01)
*G01B 21/16* (2006.01)
*B21D 28/24* (2006.01)

(58) Field of Classification Search
USPC .................................... 702/127, 155, 166
See application file for complete search history.

(56) References Cited

U.S. PATENT DOCUMENTS

| | | | |
|---|---|---|---|
| 5,136,521 A | 8/1992 | Van Daalen et al. | |
| 2008/0250625 A1* | 10/2008 | Slettemoen ............ | B23Q 17/22 29/407.04 |
| 2011/0112430 A1 | 5/2011 | Karo et al. | |
| 2011/0251714 A1* | 10/2011 | Nishikawa ............ | B23Q 17/20 700/174 |

FOREIGN PATENT DOCUMENTS

| | | |
|---|---|---|
| JP | 2000-033537 | 2/2000 |
| JP | 2000-033565 | 2/2000 |
| JP | 2007-075947 | 3/2007 |
| JP | 2007-245165 | 9/2007 |

OTHER PUBLICATIONS

Extended European Search Report in the European Patent Application No. 13846517.4-1568, dated Jul. 8, 2016.

\* cited by examiner

TOOL MEASURING APPARATUS

TECHNICAL FIELD

The present invention relates to a tool measuring apparatus for measuring a punch body after being ground or a die after being ground.

BACKGROUND ART

A tool to be installed in a turret punch press is configured of a punch and a die. A punch blade of a punch body and a die blade of a die will abrade away. Therefore, it is needed to grind the punch blade and the die blade (see Patent Documents 1 and 2 listed below). In addition, the punch body or the die is checked before or after being ground in order to judge whether or not the punch body or the die reach its grinding tolerance (see Patent Document 3 listed below).

PRIOR ART DOCUMENT

Patent Document

Patent Document 1: Japanese Patent Application Publication No. 2000-33565
Patent Document 2: Japanese Patent Application Publication No. 2007-75947
Patent Document 3: Japanese Patent Application Publication No. 2000-33536

SUMMARY OF INVENTION

In apparatuses disclosed by the Patent Documents 1 and 2, a contact position of a punch or a die with a grinding stone is electrically detected, and then the punch or the die is abraded (ground). In an apparatus disclosed by the Patent Document 3, a punch or a die is checked in order to judge whether or not its abrasion stays within its tolerable range. However, in the apparatuses disclosed by the Patent Documents 1 to 3, the punch or the die after being ground is not measured. Therefore, a measuring apparatus for measuring punches and dies after being ground in order to manage the punches and the dies.

In a case of measuring a punch or a die after being ground, measuring can be done by using a height gauge or the like. However, generally, a height (length) of a punch and a height of a die are significantly different from each other. Therefore, in order to measure punches and dies by using a single height gauge, a height gauge with a wide measurement range covering a large size punch is needed. Note that, also in a case of using a measurement device such as a linear scale, a linear scale with a wide measurement range covering a large size punch is needed. Namely, an expensive measurement device with a wide measurement range is needed.

Therefore, an object of the present invention is to provide a tool measuring apparatus that can measure a punch body and a die easily even in a case where a size of the punch body and a size of the die are significantly different from each other.

An aspect of the present invention provides a tool measuring apparatus for measuring a height of a punch body and a die, the apparatus comprising: a measurement device that measures a distance from a punch reference position that is set preliminarily to an end surface of the punch body, and a distance from a die reference position that is set preliminarily to an end surface of the die, wherein the punch reference position and the die reference position are placed independently from each other.

It is preferable that the die reference position is placed closer to the measurement device than the punch body reference position is.

In addition, it is preferable that the tool measuring apparatus further comprises a die support member on which the die is put, and a punch body support member that supports the punch body, wherein the die reference position is provided on the die support member, the punch reference position is provided on the punch body support member, and a holder that holds the punch body is further formed on the die support member.

In addition, it is preferable that the tool measuring apparatus further comprises an arithmetic unit that calculates the height of the punch body or the die based on a measurement result of the measurement device, a code reader that scans an identification code marked on the punch body or the die, and a communication unit that communicates with a tool management unit that manages tools.

Here, it is preferable that the measurement device includes a movable measurement element that is to be contacted with the end surface of the punch set at the punch reference position or the die set at the die reference position, a measurement reference position that serves as a reference of a movement position of the measurement element is set, a distance L1 from the measurement reference position to the die reference position is set fixedly, a distance L2 from the die reference position to the punch reference position is set fixedly, a distance L3 from the measurement reference position to the punch reference position is set fixedly, and, if a stroke of the measurement element from the measurement reference position when the measurement element is contacted with the end surface of the die is denoted as ST1 and a stroke of the measurement element from the measurement reference position when the measurement element is contacted with the end surface of the punch body is denoted as ST2, the arithmetic unit calculates the height of the die by (L1−ST1), or calculates the height of the punch body by (L3−ST2)=(L1−ST2+L2).

In addition, it is preferable that the tool measuring apparatus is integrated with a tool grinding apparatus, or is set up adjacent to a tool grinding apparatus.

DESCRIPTION OF EMBODIMENTS

Figure 1:
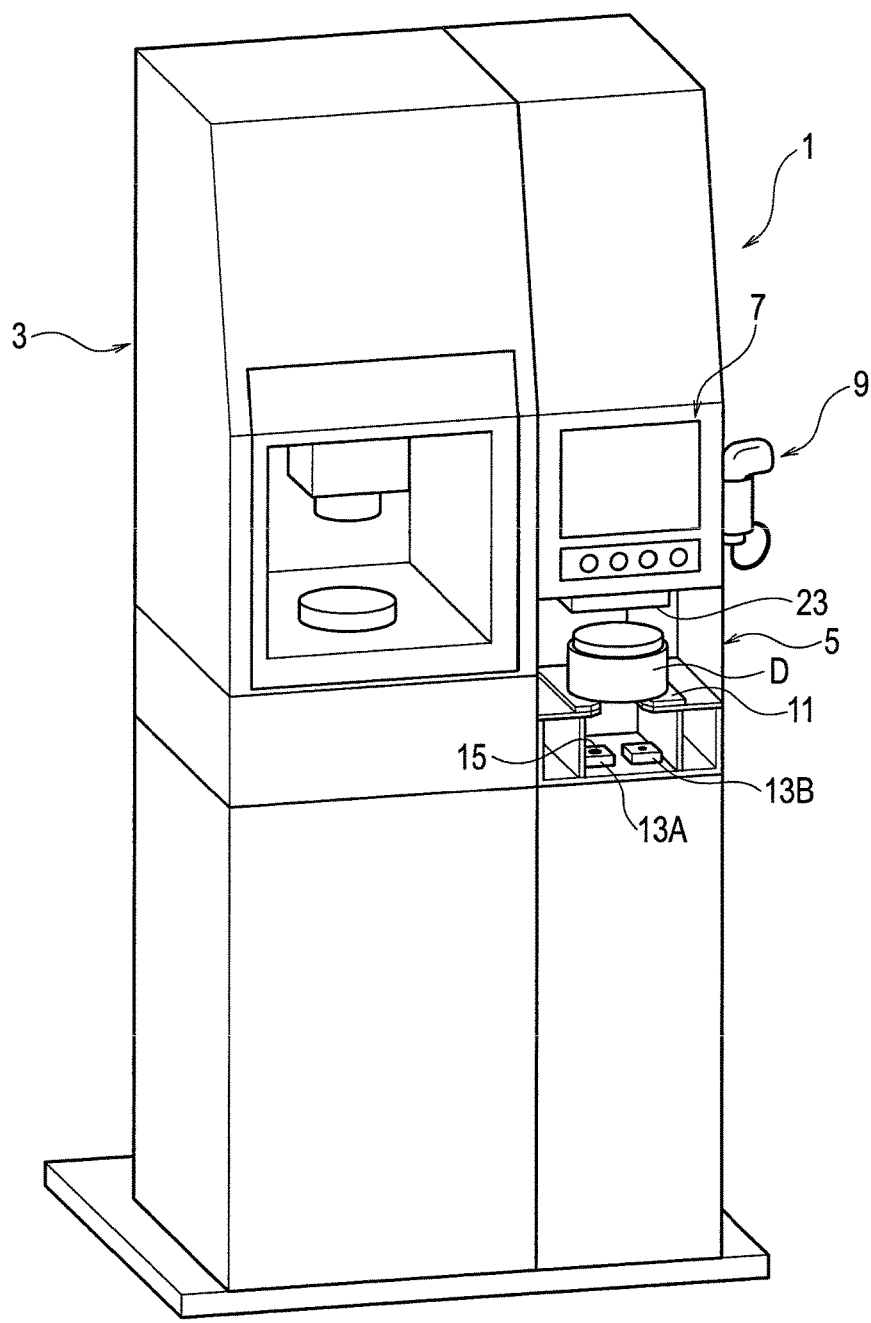
FIG. 1 It is a perspective view showing a tool measuring apparatus according to an embodiment.

As shown in FIG. 1, a tool measuring apparatus 1 according to an embodiment is integrated with a tool grinding apparatus 3 for abrading (grinding) a tool (a punch and a die) (or, is set up adjacent to a tool grinding apparatus 3). Note that the tool grinding apparatus 3 may include configurations of apparatuses disclosed by the above-mentioned Patent Documents 1 and 2, or may include configurations of a general tool grinding apparatus. Therefore, detailed explanations of the configurations of the tool grinding apparatus 3 will be omitted.

The tool measuring apparatus 1 measures a height (length) of a punch (punch body) and a height of a die that are ground by the tool grinding apparatus 3. The tool measuring apparatus 1 includes a measurement area 5 at which a punch or a die is measured, and a controller 7 for controlling operations thereof. In addition, the tool measuring apparatus 1 includes a code reader 9 for scanning an identification code (e.g. a barcode, or an ID tag) marked on a punch or a die.

A die support plate (die support member) 11 for supporting a die D (see FIG. 3) is provided in the measurement area 5. An upper surface of the die support plate 11 is a reference position (die reference position) for measuring a height of the die D. Punch body support blocks (punch body support members) 13A and 13B for supporting a head end of a punch body P (see FIG. 2) is provided beneath the die support plate 11.

The punch body support blocks 13A and 13B are a reference position (punch reference position) for measuring the punch body P, and are associated with different sizes of a diameter of the punch body P. More in detail, an insertion hole 15 into which the head end of the punch body P is inserted is formed on each of the punch body support blocks 13A and 13B, and a bottom surface of the insertion hole(s) 15 is the above-mentioned punch reference position.

When inserting the head end of the punch body P into the insertion hole 15, an end surface of the head end is contacted with the bottom surface of the insertion hole 15, i.e. punch reference position. Holders 17A and 17B are provided on the die support plate 11 in order to hold a vertical state of the punch body P, the end surface of whose head end is being contacted with the punch reference position. Each of the holders 17A and 17B is formed so as to have a keyhole shape that includes a circle associated with a size of diameter of the punch body P and is opened toward a front side of the tool measuring apparatus 1.

Figure 2:
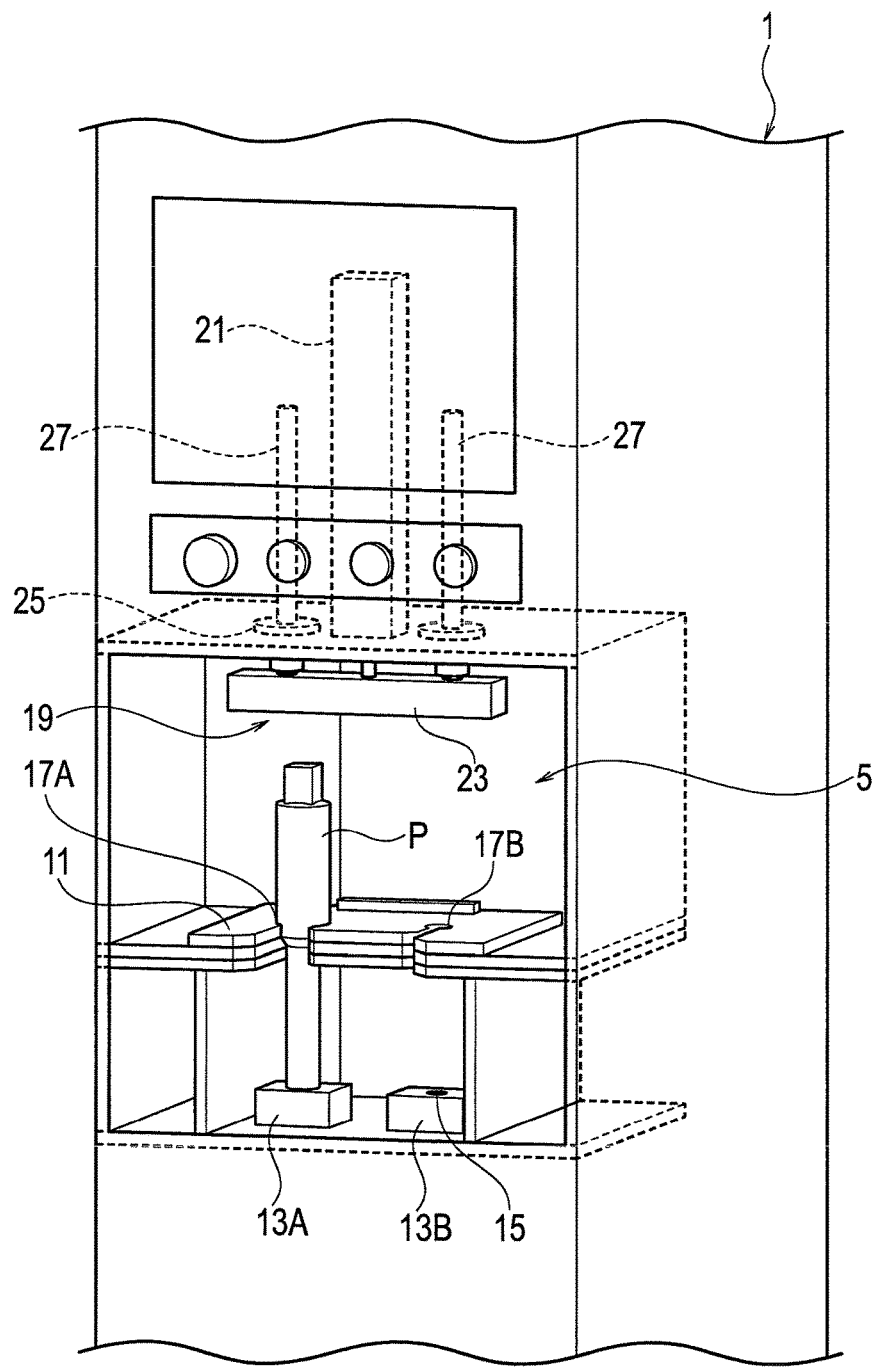
FIG. 2 It is a perspective view showing a featured portion of the tool measuring apparatus (when measuring a punch).
Figure 3:
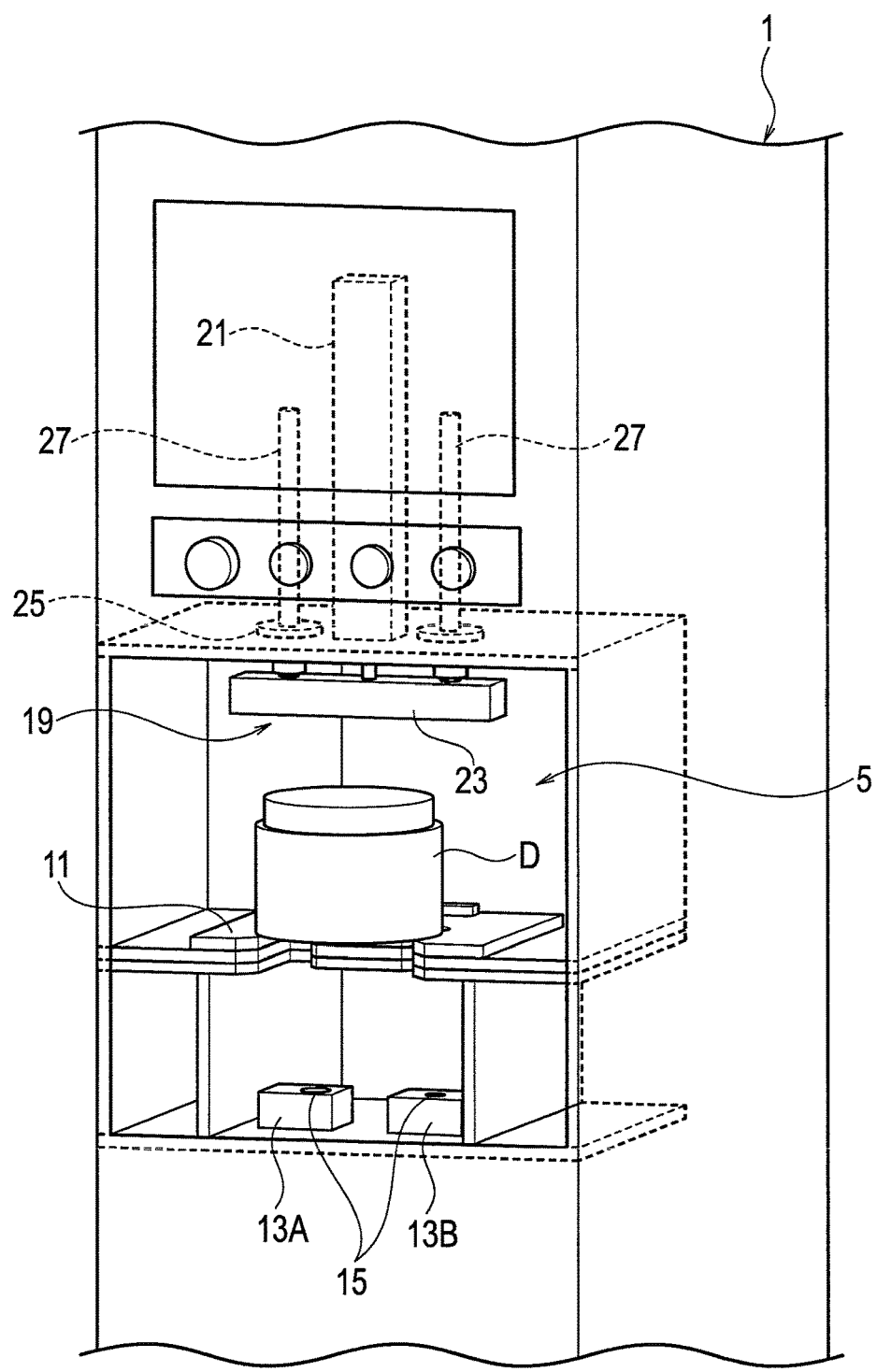
FIG. 3 It is a perspective view showing the featured portion of the tool measuring apparatus (when measuring a die).

When inserting the punch body P to the holder 17A or 17B from the front side and inserting the head end into the insertion hole 15, the punch body P is held in the vertical state (see FIG. 2). In this manner, the punch body P can be easily set at the measurement area 5. Note that the die D is set at the measurement area 5 when being put on the die support plate 11 (see FIG. 3). Namely, the die D can be also set at the measurement area 5 easily.

A measurement device 19 for measuring a height of the die D and the punch body P set at the measurement area 5 is provided above the measurement area 5. The measurement device 19 includes an actuator 21 and a measurement element 23. The actuator 21 is a fluid pressure cylinder, and moves the measurement element 23 vertically.

Lower ends of paired guide rods 27 that are vertically guided by guide sleeves 25 provided above are connected with the measurement element 23. While the measurement element 23 is moved vertically by the actuator 21, the measurement element 23 is maintained horizontally by the guide sleeves 25 and the guide rods 27. A distance from a measurement reference position (the punch reference position or the die reference position) to a lower surface of the measurement element 23 is detected by a detector 37 (e.g. a liner scale: see FIG. 5).

Figure 4:
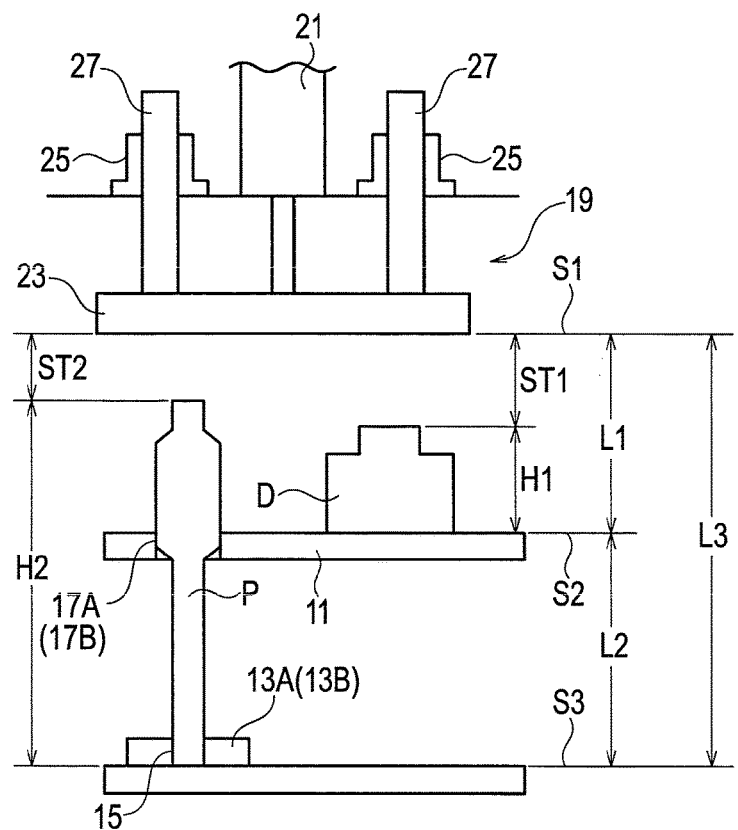
FIG. 4 It is a schematic side view of the featured portion.

Therefore, a height from the punch reference position to an upper end surface of the punch body P or a height from the die reference position to an upper surface of the die D can be measured by measuring the distance from the measurement reference position (the punch reference position or the die reference position) to the lower surface of the measurement element 23. As shown in FIG. 4, a distance L1 from a measurement reference position S1 of the measurement element 23 to the die reference position S2 (the upper surface of the die support plate 11) is set fixedly. The measurement reference position S1 of the measurement element 23 is a position that serves as a reference of a movement position of the measurement element 23. Similarly, a distance L2 from the punch reference position S3 (the bottom surface of the insertion hole(s) 15) to the die reference position S2 (the upper surface of the die support plate 11) is also set fixedly. Therefore, a distance L3 from the punch reference position S3 (the bottom surface of the insertion hole(s) 15) to measurement reference position S1 of the measurement element 23 is also set fixedly.

Figure 5:
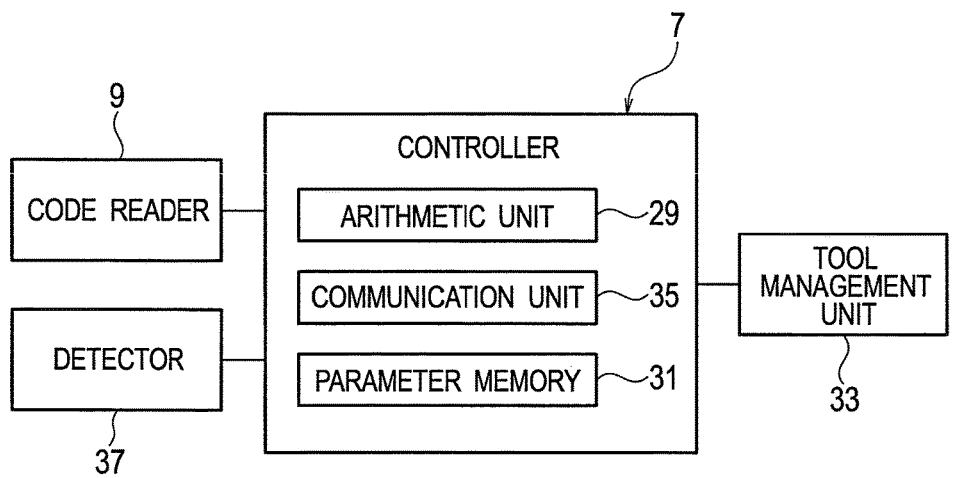
FIG. 5 It is a block diagram of the tool measuring apparatus.

As shown in FIG. 5, the controller 7 is configured of a computer, and provided with an arithmetic unit 29 that calculates a height of the punch body P or the die D. In addition, a tool management unit 33 that manages tools is connected to the controller 7. Further, the controller 7 is provided with a parameter memory 31 in which the fixedly-set distances L1, L2 and L3 are stored as parameters, and a communication unit 35 for communicating with the tool management unit 33.

When setting the die D or the punch body P at the measurement area 5, the identification code marked on the die D or the punch body P is scanned by the code reader 9. Then, the measurement element 23 is moved downward by the actuator 21 to contact the lower surface of the measurement element 23 with the upper end surface of the Die D or the punch body P, and a stroke ST1 or ST2 from the measurement reference position S1 to the upper end surface is detected by the detector 37. When the stroke ST1 or ST2 is detected, the arithmetic unit 29 executes calculation of H2=L3−ST2 (=L1−ST2+L2) to get a height H2 of the punch body P.

A height H1 of the die D or a height H2 of the punch body P that is calculated is associated with the identification code (i.e. a tool number) scanned by the code reader 9, and then transmitted to the tool management unit 33 as measurement data by the communication unit 35. The tool management unit 33 manages tools by utilizing the received measurement data. For example, the tool management unit 33 refers to the tool number, an initial height and the calculated height H1 or H2 of the die D or the punch body P, and manages a remaining grinding margin or lifetime of the die D or the punch body P.

In the present embodiment, the die reference position S2 and the punch reference position S3 are placed independently from each other. Namely, the die reference position S2 and the punch reference position S3 are set at different positions from each other. Therefore, according to the present embodiment, it is possible to measure a punch body P and a die D easily even in a case where a size of the punch body P and a size of the die D are significantly different from each other. In addition, an error included in a measured value can be reduced by shortening a measurement stroke, and thereby measurement accuracy can be improved. Further, a punch body P and a die D can be measured in an identical measurement range, so that it becomes possible to manage (a grinding margin, a lifetime and so on of) a punch body P and a die D configuring a tool in a pair in an identical manner.

If the die reference position S2 and the punch reference position S3 are to be merged into one, the punch reference position S3 that enables measuring of a punch body P whose height is generally higher than that of a die D must be adopted. Namely, it becomes inevitable to make measurement by placing a die D whose height is generally lower than that of a punch body P on the punch reference position S3. Here, the above-mentioned stroke ST1 or ST2 detected by the measurement device 19 is significantly shorter than the distance L3. However, a stroke (L3−H1) becomes extremely longer inevitably when making measurement by placing a die D on the punch reference position S3.

According to the present embodiment, by providing the die reference position S2 and the punch reference position S3 independently from each other, a stroke of the measurement element 23 can be made small by a difference between the reference positions S2 and S3, so that the detector 37 can be downsized. Namely, the strokes ST1 and ST2 can be measured in an almost identical small stroke range, so that the detector 37 can be downsized. In a case where a long stroke must be measured, a vertical movable range of the measurement element 23 must be made wider, so that the detector 37 must become larger inevitably.

The present invention is not limited to the above embodiment, and can be achieved in another embodiment with proper modifications. For example, in the above embodiment, explained is a case where the measurement element 23 is moved to be contacted with the upper end surface of the die D or the punch body P. However, a non-contact sensor such as a laser displacement meter may be provided at the measurement reference position S1, and the above-mentioned stroke S1 or S2 may be measured by this sensor. Also in this case, a measured length corresponding to the stroke in the above embodiment can be made short, so that its laser output unit can be made small and a detector can be made downsized.

The invention claimed is:

1. A tool measuring apparatus for measuring a height of a punch body and a die, the apparatus comprising:
    a measurement device that measures a distance from a punch reference position, which is preset, to an end surface of the punch body, and a distance from a die reference position, which is preset, to an end surface of the die;
    a punch body support member that supports the punch body; and
    a die support member on which the die is disposed, wherein
    the punch reference position and the die reference position are placed independently from each other,
    the die reference position is provided on the die support member,
    the punch reference position is provided on the punch body support member, and
    a holder that provides access through the die support member and holds the punch body in a vertical state.

2. The tool measuring apparatus according to claim 1, wherein
    the die reference position is placed closer to the measurement device than the punch body reference position.

3. The tool measuring apparatus according to claim 1, further comprising
    a computer
    that calculates the height of the punch body or the die based on a measurement result of the measurement device, and that communicates with a receiver of a tool management unit; and
    a code reader that scans an identification code marked on the punch body or the die.

4. The tool measuring apparatus according to claim 3, wherein,
    the measurement device includes a movable measurement element that is to be contacted with the end surface of the punch set at the punch reference position or the die set at the die reference position,
    a measurement reference position that serves as a reference of a movement position of the measurement element is set,
    a distance L1 from the measurement reference position to the die reference position is set fixedly,
    a distance L2 from the die reference position to the punch reference position is set fixedly,
    a distance L3 from the measurement reference position to the punch reference position is set fixedly, and,
    if a stroke of the measurement element from the measurement reference position when the measurement element is contacted with the end surface of the die is denoted as ST1 and a stroke of the measurement element from the measurement reference position when the measurement element is contacted with the end surface of the punch body is denoted as ST2, the computer calculates the height of the die by (L1−ST1), or calculates the height of the punch body by (L3−ST2)=(L1−ST2+L2).

5. The tool measuring apparatus according to claim 1, wherein
    the tool measuring apparatus is integrated with a tool grinding apparatus, or is set up adjacent to the tool grinding apparatus.

6. The tool measuring apparatus according to claim 1, wherein the punch and the die are offset from each other in a direction perpendicular to the die reference position.

* * * * *